United States Patent
Tran et al.

[19]

[11] Patent Number: 6,038,294

[45] Date of Patent: *Mar. 14, 2000

[54] METHOD AND APPARATUS FOR CONFIGURING A MODEM CAPABLE OF OPERATING IN A PLURALITY OF MODES

[75] Inventors: Wayne D. Tran, San Jose; Michael E. Pierce, Orangevale, both of Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/774,231

[22] Filed: Dec. 27, 1996

Related U.S. Application Data

[63] Continuation of application No. 08/313,919, Sep. 28, 1994, abandoned.

[51] Int. Cl.[7] .................................................. H04M 11/00

[52] U.S. Cl. ..................................... 379/93.07; 379/93.34; 379/93.29; 455/557

[58] Field of Search ................................ 379/98, 59, 58, 379/60, 63, 93, 94, 97, 96, 100, 90.01, 93.05, 93.06, 93.07, 93.08, 93.29, 93.31, 93.32, 93.34, 110; 375/222; 455/557, 556, 559

[56] References Cited

U.S. PATENT DOCUMENTS

| | | | |
|---|---|---|---|
| 4,837,812 | 6/1989 | Takahashi et al. | 379/93.07 |
| 5,127,041 | 6/1992 | O'Sullivan | 379/98 |
| 5,134,648 | 7/1992 | Hochfield et al. | 379/98 |
| 5,249,218 | 9/1993 | Sainton | 379/98 |
| 5,287,401 | 2/1994 | Lin | 379/98 |
| 5,353,334 | 10/1994 | O'Sullivan | 379/98 |
| 5,367,563 | 11/1994 | Sainton | 379/98 |
| 5,428,671 | 6/1995 | Dykes et al. | 379/93.32 |
| 5,430,793 | 7/1995 | Ueltzen et al. | 379/98 |

*Primary Examiner*—Stella Woo
*Attorney, Agent, or Firm*—Blakely, Sokoloff, Taylor & Zafman LLP

[57] ABSTRACT

A modem device is described. The modem device comprises a first connector allowing coupling to a telecommunications transmission system, a second connector allowing coupling to a computer system, and a selector capable of receiving a mode select signal and capable of automatically selecting between operational modes in response to the mode select signal. It also comprises a circuit capable of receiving signals from the telecommunications transmission system in a selected operational mode and transmitting signals to a computer system. The circuit also is capable of receiving signals from the computer system and transmitting signals to the telecommunications transmission system in the selected operational mode.

21 Claims, 3 Drawing Sheets

METHOD AND APPARATUS FOR CONFIGURING A MODEM CAPABLE OF OPERATING IN A PLURALITY OF MODES

This is a continuation of application Ser. No. 08/313,919, filed Sep. 28, 1994, now abandoned.

FIELD OF THE INVENTION

The present invention relates to the field of electronic data processing devices. More particularly, the present invention relates to the transfer of information between a telecommunications transmission system and a computer system.

BACKGROUND OF THE INVENTION

One prior modem device modulates digital computer signals into analog signals for transmission on a Public Switched Telephone Network (PSTN) telecommunications system and demodulates analog transmission signals received from a PSTN telecommunications system into digital computer signals.

However, the prior modem devices cannot transmit or receive signals over a cellular telecommunications system; because, the cellular system utilizes signals of a different format than the PSTN system. Thus, when using the prior modem device with a portable computer, the user is limited to areas with access to a PSTN telecommunications system. This limitation restricts the portability of portable computer systems. In addition, because the prior modem device can only operate on one type of telecommunications system (i.e. a PSTN system), the user does not face the previously unrecognized problem of selecting a mode for a telecommunications system and performing the necessary configuration steps to switch to the selected mode. This problem, which occurs on a modem device that can operate on more than one type of telecommunications system, greatly reduces the convenience and ease of using a modem device.

Thus, a modem device capable of transmitting and receiving telecommunications signals in a plurality of operational modes is needed.

What is also needed is a modem device capable of automatically selecting between a plurality of operational modes.

SUMMARY OF THE INVENTION

A novel modem device is described. The modem device receives a mode select signal from an external component, selects a transmission mode from a plurality of transmission modes in response to the mode select signal, receives a first plurality of signals from the telecommunications transmission system in the selected transmission mode, transmits a second plurality of signals corresponding to the first plurality of signals to a computer system, receives a third plurality of signals from the computer system, and transmits a fourth plurality of signals to the telecommunications transmission system in the selected transmission mode. Under an alternative embodiment, the modem device comprises a first connector allowing coupling to a telecommunications transmission system, a second connector allowing coupling to a computer system, and a selector capable of receiving a mode select signal and capable of automatically selecting between operational modes in response to the mode select signal. It also comprises a circuit capable of receiving signals from the telecommunications transmission system in a selected operational mode and transmitting signals to a computer system. The circuit also is capable of receiving signals from the computer system and transmitting signals to the telecommunications transmission system in the selected operational mode. Under another alternative embodiment, the modem device is capable of selecting between an analog public switched telephone network mode and an analog cellular telephone mode.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A novel modem device is described. In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
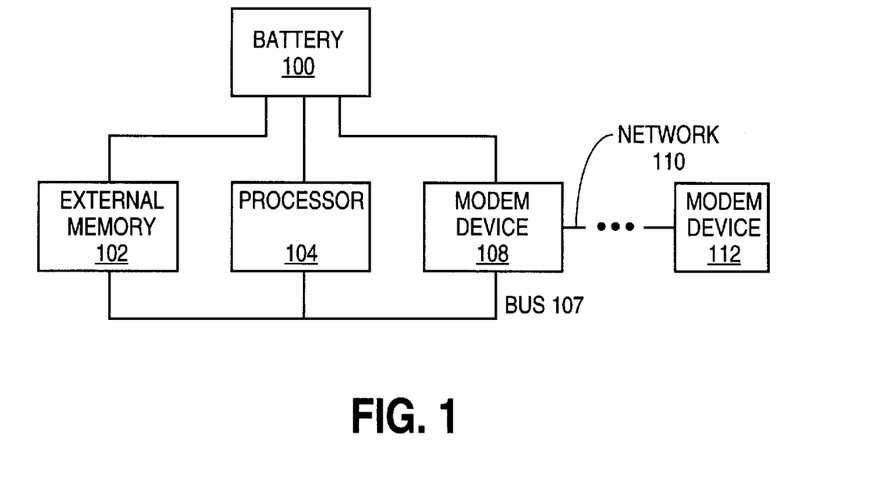
FIG. 1 illustrates in block diagram form a computer system of one embodiment of the present invention.

FIG. 1 illustrates in block diagram form a computer system of one embodiment of the present invention. The computer system includes battery 100, external memory 102, processor 104, bus 107 and modem device 108. Battery device 100 supplies power to external memory 102, processor 104 and modem device 108. Battery device 100 can be a nickel-cadmium (NiCd) battery, nickel metal hydride (Ne) battery, lithium-ion battery or other charge storage device. External memory 102 stores information from a mass storage device such as a hard disk drive, floppy disk drive or CAROM device for use by processor 104. External memory 102 also stores information from processor 104. External memory 102 can be a dynamic random access memory (DRAM) device, static random access memory (SRAM) device or a cache memory device. Processor 104 is coupled to external memory 102 and modem device 108. Processor 104 executes instructions and processes data. Processor 104 can be a complex instruction set computer (CISC) microprocessor, reduced instruction set computer (RISC) microprocessor or other microprocessor. Bus 107 is coupled to external memory 102, processor 104 and modem device 108. Bus 107 provides communication links between external memory 102, processor 104 and modem device 108. Bus 107 can be an Industry Standard Architecture (ISA) bus, Extended Industry Standard Architecture (EISA) bus, Peripheral Components Interconnect (PCI) bus or any other bus. Modem device 108 is coupled to processor 104 and is also coupled to modem 112 by telecommunications network 110. Modem 108 transforms serial telecommunication signals into parallel computer signals through a demodulation process. It also transforms parallel computer signals from processor 104 into serial telecommunication signals through a modulation process. In addition, modem device 108 is capable of receiving a mode select signal and capable of automatically selecting between a plurality of operational modes in response to the mode select signal. The plurality of operational modes comprise different telecommunications transmission modes. One of the telecommunications transmission modes is an analog cellular telephone mode. Another telecommunications transmission mode is a PSTN mode.

Modem 108 converts a binary digital data stream generated by processor 104 into an angle modulated analog signal that is suitable for transmission over the external telecommunications network. This process is referred to as modulation. Modem 108 also converts the angle modulated analog signal from the external telecommunications network back to digital form for processing by processor 104. This process is referred to as demodulation. The operation of modem 108 with respect to its modulation and demodulation function will be briefly described below.

Modem 108 receives binary digital data transferred from processor 104 on bus 107. Modem 108 modulates the binary digital data through an angle modulation scheme in a frequency band suitable for transmission over telecommunications network 110. The modulated data is then transferred to another modem 112 at another end of the telephone telecommunications network 110.

For one embodiment, the angle modulation is a frequency shift keyed ("FSK") modulation. For another embodiment, the angle modulation is a phase modulation.

When the FSK modulation scheme is employed to modulate the digital data, modem 108 transmits one frequency signal in the voice band for a binary zero, for example, and another frequency signal in the voice band for binary one.

Modem 108 transfers the modulated data to the telecommunications network at a certain transfer rate. For one embodiment, the transfer rate of the modulated data from modem 108 is 14,400 bits per second. In other embodiments, the transfer rate of the modulated data from modem 108 can be more or fewer than 14,400 bits per second. For example, the transfer rate of the modulated data from modem 108 can be 9600 bits per second or 4800 bits per second. In addition to data, modem 108 can also transmit and receive facsimile transactions.

When modem 108 receives modulated data from the telecommunications network, modem 108 demodulates the angle modulated signal back into the digital form. To perform correctly, modem 108 must match the data communication specification of bus 107 as well as the telecommunications network. Numerous standards that govern both the mechanical interface and language protocols exist.

Figure 2:
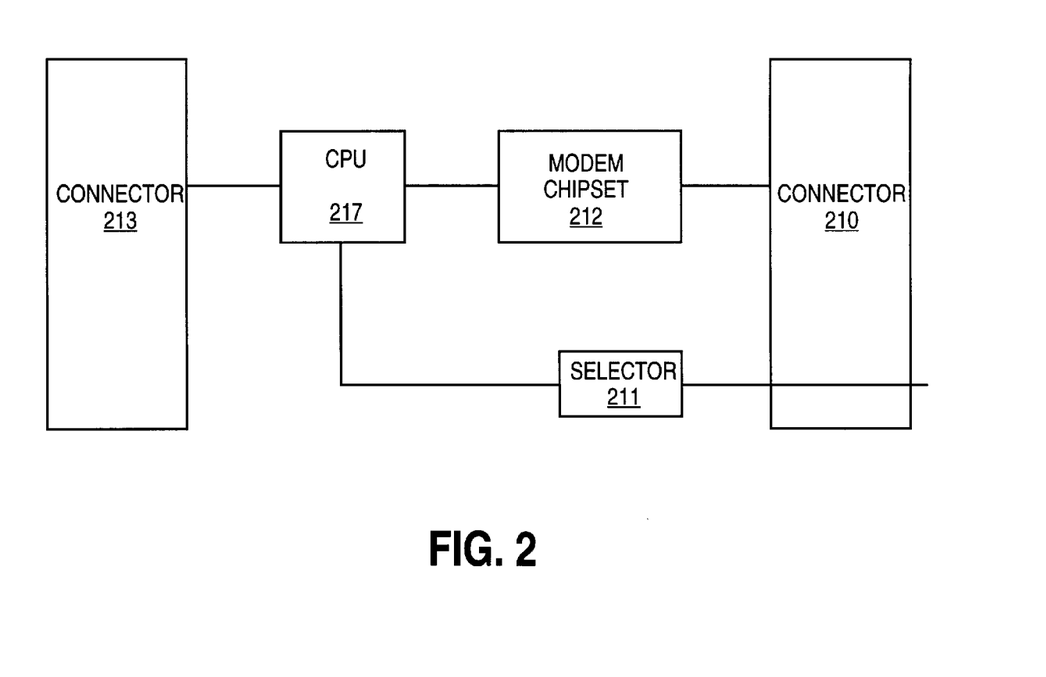
FIG. 2 illustrates in block diagram form a modem device of a second embodiment of the present invention.

FIG. 2 illustrates in block diagram form a modem device of a second embodiment of the present invention. In this embodiment, the modem device comprises connector 210, selector 211, modem chipset 212, connector 213 and central processing unit 217. Connector 210 is coupled to selector 211 and modem chipset 212. Selector 211 is coupled to central processing unit 217 and modem chipset 212 is also coupled to central processing unit 217. Alternatively, selector 211 can be coupled to modem chipset 212. Central processing unit 217 is in turn coupled to connector 213. Connector 210 allows modem chipset 212 and central processing unit 217 to be coupled to a telecommunications transmission system. Connector 213 allows modem chipset 212 and central processing unit 217 to be coupled to a computer system. Modem chipset 212 modulates computer signals into telecommunications signals and demodulates telecommunications signals into computer signals. Modem chipset 212 can comprise a component such as a digital signal processor to perform such functions. Central processing unit 217 maintains overall control of modem chipset 212. It executes instructions that comprise the modem firmware. It also performs data compression functions and determines when data from the telecommunications system is valid or invalid.

The modem device can also comprise an Application Specific Integrated Circuit (ASIC) component. The ASIC component acts as an interface between modem device 108 and bus 107. In addition, the ASIC component can act as an output buffer to central processing unit 217. In this manner, the overhead of central processing unit 217 is reduced. Selector 211 receives a mode select signal through connector 210 and is capable of automatically selecting between operational modes in response to the mode select signal. When selector 211 receives a floating signal as the mode select signal, selector 211 selects the analog PSTN telephone mode. On the other hand, when selector 211 receives a ground potential as the mode select signal, selector 211 selects the analog cellular telephone mode. Selector 211 can also be programmed to select the digital cellular telephone mode in response to a ground potential. Selector 211 can reside in central processing unit 217 or can reside outside of central processing unit 217. Alternatively, selector 211 can reside in modem chipset 212 or can reside outside of modem chipset 212. Selector 211 causes modem chipset 212 to transform serial telecommunications signals into parallel computer signals and parallel computer signals into serial telecommunications signals depending on the operational mode selected. Selector 211 can accomplish this task in a variety of different ways. One possibility is to transmit a select signal to central processing unit 217 which selects the operational mode and instructs modem chipset 212 to switch to the operational mode. Another possibility is to transmit a value to modem chipset 212 which is read by central processing unit 217 causing central processing unit 217 to instruct modem chipset 212 to transmit in the selected operational mode.

In this embodiment, selector 211 selects an operational mode by loading the appropriate configuration parameters for that mode. Modem chipset 212 transforms parallel computer signals into serial telecommunications signals using FSK modulation techniques. Modem chipset 212 first aligns the individual signals of the parallel form of the computer signals behind each other to form serial signals. Then, for every digital DC signal received by modem chipset 212, modem chipset 212 transmits an analog signal of a given frequency. Modem chipset 212 transmits an analog signal of a first frequency when modem chipset 212 receives a digital signal at a high potential and transmits an analog signal of a second frequency when modem chipset 212 receives a digital signal of a low potential. The analog signals of the first frequency or the second frequency are transmitted through connector 210 to the telecommunications transmission system. Modem chipset 212 transforms serial telecommunications signals into parallel computer signal using FSK demodulation techniques. Modem chipset 212 first receives the serial telecommunications signals and demodulates them into digital signals. In this process, when modem chipset 212 receives an analog signal of a first frequency, modem chipset 212 stores a digital signal of a high potential. When modem chipset 212 receives an analog telecommunications signal of a second frequency, modem chipset 212 stores a digital signal of a low potential. Each digital signal stored by modem chipset 212 comprises a bit of information. When modem chipset 212 receives enough bits to fill the bit width of bus 107, modem chipset 212 transmits the bits all at once in the form of digital DC computer signals. Modem chipset 212 transmits the digital computer signals through central processing unit 217 and connector 213 to processor 104. In this manner, modem chipset 212 transforms analog serial telecommunications signals into parallel computer signals.

Under a third embodiment of the present invention, modem chipset 212 transforms the parallel form of the computer signals into serial telecommunications signals using phase modulation techniques. Modem chipset 212 also demodulates serial telecommunications signals into parallel computer signals using phase demodulation techniques. With phase modulation, the techniques employed are similar to FSK modulation with the exception that modem chipset 212 transmits an analog signal of a given frequency at a first phase when modem chipset 212 receives a digital signal at a high potential and transmits an analog signal of the given frequency at a second phase when modem chipset 212 receives a digital signal of a low potential. Likewise, the techniques employed with phase demodulation is similar to FSK demodulation with the exception that modem chipset 212 stores a digital signal of a high potential when modem chipset 212 receives an analog signal of the given frequency at a first phase and stores a digital signal of a low potential when modem chipset 212 receives an analog signal of the given frequency at a second phase. a fourth embodiment, modem chipset 212 utilizes both FSK and phase modulation. Here, three or four bits can be transmitted or received simultaneously over the telecommunications network A combination of different frequencies and different phases is utilized to transmit the bits of information. Thus, in this embodiment, modem chipset 212 transforms the parallel form of the computer signals into parallel telecommunications signals and transforms parallel telecommunications signals into the parallel form of the computer signals.

Figure 3:
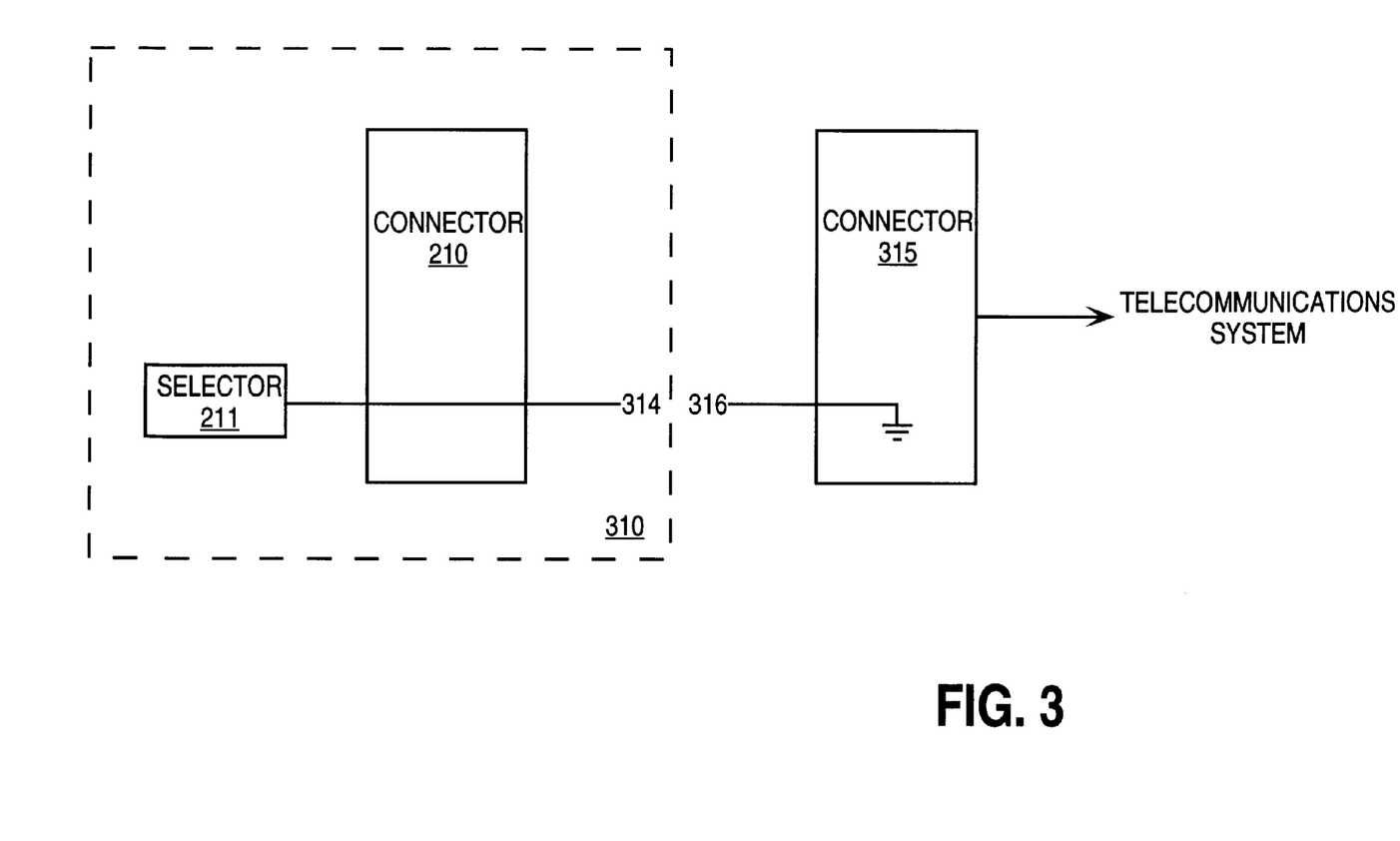
FIG. 3 illustrates in block diagram form a modem device of a fifth embodiment of the present invention.

FIG. 3 illustrates in block diagram form a modem device of a fifth embodiment of the present invention. In this embodiment, modem device 310 comprises connector 210 and selector 211. Connector 210 includes pin 314. Pin 314 in turn is coupled to selector 211. Selector 211 receives a mode select signal through pin 314. FIG. 3 also illustrates connector 315 which is used to couple modem device 108 to a telecommunications network. Connector 315 includes pin 316. When connector 315 is coupled to connector 210, pin 316 is also coupled to pin 314. Pin 316 can either be connected to a ground potential or left floating. When pin 316 is left floating, connector 315 sends a first mode select signal through connector 210 to selector 211. This first mode select signal indicates to selector 211 to select an analog PSTN telephone mode. On the other hand, when pin 316 is coupled to a ground potential, connector 315 sends a second mode select signal through connector 210 to selector 211. This second mode select signal indicates to selector 211 to select an analog cellular telephone mode. In this embodiment, when the user wants to couple modem 108 to an analog PSTN telecommunication system, the user selects the appropriate connector 315 to couple to connector 210. A line to the telecommunication system is coupled to connector 315. Connector 315, in this case, will have pin 316 which is floating. On the other hand, when the user wants to couple modem device 108 to an analog cellular telecommunications system, the user selects a different connector 315 to couple to connector 210. Connector 315 in this case, has pin 316 which is coupled to a ground potential. A line from the cellular telephone device couples connector 315 to the analog cellular telecommunications system.

Under a sixth embodiment of the present invention, connector 210 also includes a TIP pin and a RING pin. The TIP pin is coupled to a TIP signal line and the RING pin is coupled to a RING signal line. The TIP signal line and the RING signal line are in turn coupled to modem chipset 212. Modem chipset 212 uses the TIP signal line and pin to transmit and receive analog telecommunications signals over a PSTN system. It also uses the RING signal line and pin as a reference potential in conjunction with the transmission and reception of the telecommunications signals. In addition, connector 210 includes a TXAL pin and a RXAL pin. The TXAL pin is coupled to a TXAL signal line and the RXAL pin is coupled to a RXAL signal line. The TXAL signal line and the RXAL signal line are in turn coupled to modem chipset 212. When selector 211 selects an analog cellular telephone mode, modem chipset 212 uses the TXAL signal line and pin to transmit analog telecommunications signals over a cellular telephone system. It also uses the RXAL signal line and pin to receive analog telecommunications signals over the cellular telephone system. Moreover, connector 210 also includes five additional pins and signal lines all coupled to modem chipset 212 The five pins are used by modem chipset 212 for digital control signals over the cellular telephone system. The specific use of each of the five pins depends on the particular cellular telephone which is being coupled to modem device 108.

Figure 4:
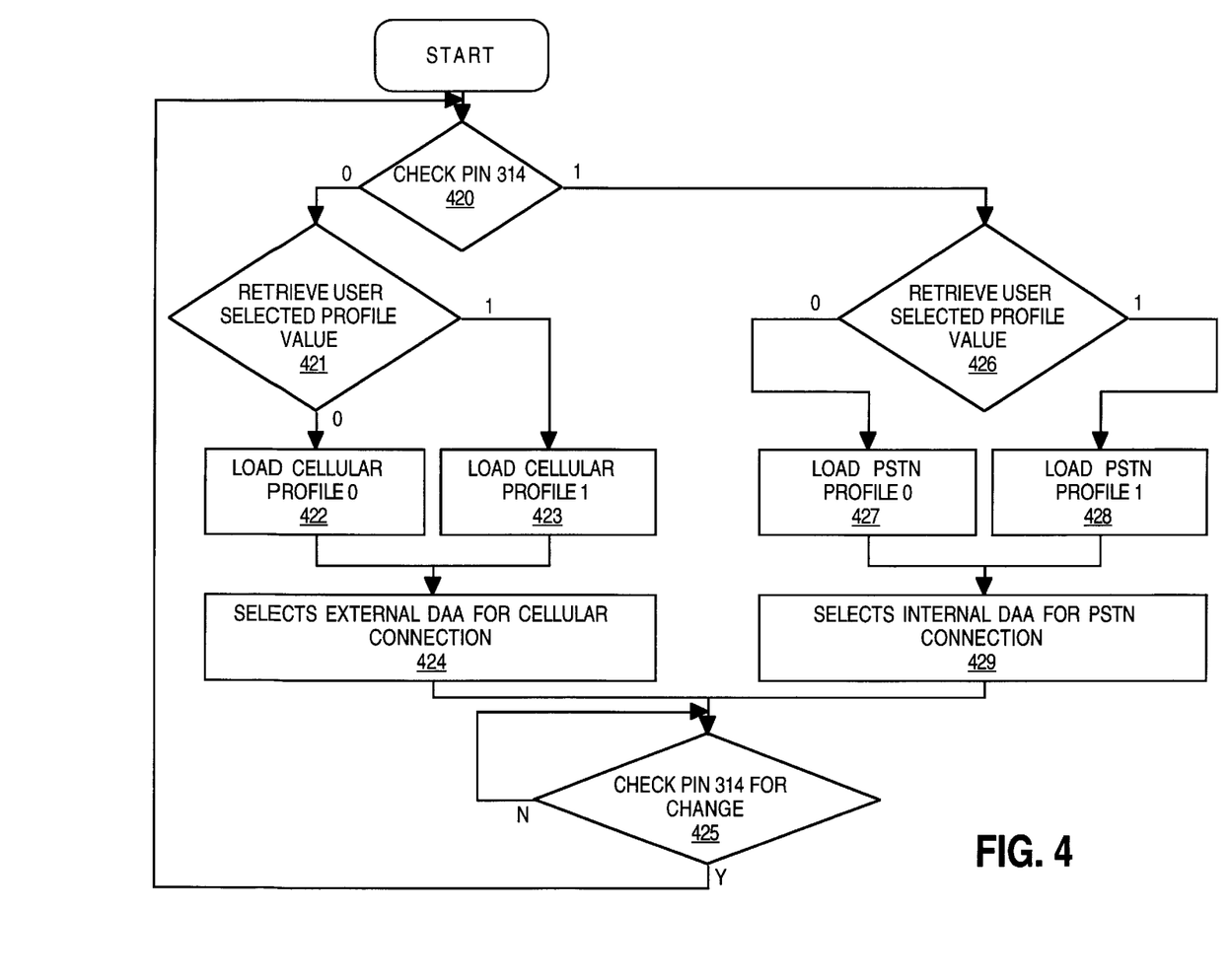
FIG. 4 illustrates in flow chart diagram form the operation of a selector of a seventh embodiment of the present invention.

FIG. 4 illustrates in flow chart diagram form the operation of a selector of a seventh embodiment of the present invention. In this embodiment, the mode select line is coupled to a pull-up resistor and a high voltage potential. Thus, when a floating signal is transmitted to selector 211, the pull-up resistor transforms the floating signal into a high voltage potential. When modem device 108 is powered up, selector 211 checks pin 314 as shown in block 420. Selector 211 checks pin 314 by sampling the mode select line and thus, the mode select pin. When selector 211 receives a ground potential as the mode select signal, it then retrieves the user selected profile value from modem memory as shown in block 421. When the profile value is a 0, selector 211 loads a first cellular profile as shown in block 422. The first cellular profile is loaded by retrieving operational parameters from modem memory which corresponds to the first cellular profile. The operational parameters are then stored into registers in modem chipset 212. On the other hand, when the profile value is a 1, selector 211 loads a second cellular profile as shown in block 423. The second cellular profile is loaded by retrieving operational parameters from memory which corresponds to the second cellular profile and storing the operational parameters into registers in central processing unit 212. When no profile value is selected by the user, selector 211 defaults to a profile value of 0 and loads the first cellular profile. After the cellular profiles have been loaded, selector 211 selects external data access arrangement (DAA) for cellular connection as shown in block 424. In selecting external DAA for cellular connection, selector 211 configures signal lines for cellular operation. Selector 211 then polls the mode select line and checks for a change in the mode select signal through pin 314 as shown in block 425. If no change has occurred, selector 211 continues to poll the mode select line. On the other hand, if a change has occurred, selector 211 returns to block 420 where it loads a cellular profile or a PSTN profile in accordance with the mode select signal.

After block 420, if selector 211 receives a high voltage potential on the mode select line (a floating signal through pin 314), selector 211 retrieves the user selected profile value. When the profile value is a 0, selector 211 loads a first PSTN profile as shown in block 427. The first PSTN profile is loaded by retrieving operational parameters from memory which corresponds to the first PSTN profile. The operational parameters are then stored into registers in modem chipset 212. On the other hand, when the profile value is a 1, selector 211 loads a second PSTN profile as shown in block 428. The second PSTN profile is loaded by retrieving operational parameters from memory which corresponds to the second PSTN profile and storing the operational parameters into registers in modem chipset 212. When no profile value is selected by the user, selector 211 defaults to a profile value of 0 and loads the first PSTN profile. After the PSTN profile has been loaded, selector 211 selects internal data access arrangement (DAA) for PSTN connection as shown in block 429. In selecting internal DAA for PSTN connection, selector 211 configures signal lines for PSTN operation. Selector 211 then polls the mode select line and checks for a change in the mode select signal through pin 314 as shown in block 425.

Under an eighth embodiment of the present invention, modem device 108 is an interrupt based device and relies on an interrupt signal to switch operational mode instead of polling the mode select line. In this embodiment, selector 211 comprises of circuitry which generates an interrupt signal when it detects a rising edge or a falling edge in the mode select signal. The rising edge or falling edge indicates a change in the operational mode. In response to the interrupt signal, selector 211 samples the mode select line and loads a cellular or PSTN profile as described above. Selector 211 also selects external DAA for cellular connection or selects internal DAA for PSTN connection as described above.

Table 1 lists the operational parameters for the PSTN and cellular profiles.

TABLE 1

FIRST PSTN PROFILE

AT Commands
B1—Selects Bell 121A when the modem is at 1200 bps and Bell 103J when the modem is at 300 bps.
E1—Enable echo in the command state.
H0—Switch hook control.
L2—Sets speaker volume level to medium.
M1—Turns the speaker on during dialing and off when carrier is detected.
N1—Determine data rate negotiation; automode enabled.
T—Select tone dialing.
Q0—Displays all result codes allowed by W, X and S95.
V1—Displays verbose result codes in English.
W0—CONNECT result code reports DTE speed.
X4—Busy and dial tone detect enabled.
Y0—Disable sending or responding to long space "break".
&B1—Enable V.32/V.32bis auto retrain.
&C1—DCD "ON" if carrier detected.
&D2—Modem enters the command mode and hangs-up if DTR is turned off.
&G0—Guard tone disable.
&K3—Enables hardware flow control (RTS/CTS).
&P0—Selects pulse dial make/break ratio to 39/61%.
&Q5—Enable error control mode.
&S0—Selects Data-Set-Ready always ON.
&U0—Enable Trellis coding—applicable only to V.32 9600 bps modulation.
\A3—Select frame size to be 256 characters per frame.
%A13—Sets Auto-Reliable fallback character.
\C0—Does not buffer data during error-control negotiation.
%C1—Enable MNP5 data compression.
%E1—Enable 2400 bps V.22bis auto-retrain.
\G0—Disable flow control (XON/XONFF).
\J0—Turn off bps rate adjust.
\K5—Break control.
\N3—Selects auto-reliable link mode: V.42 LAPM or MNP. V.42 detection enabled.
\Q3—Selects hardware flow control (RTS and CTS).
\T0—Modem will hang-up after 0 minute if it does not detect any activity.
\V1—MNP Class connect message on.
\X0—Process flow control characters locally.
*H0—Initial connection will be made according to the settings of B, N, S37, and DTE speed.
)M0—For PSTN site modem: adjust transmit levels and inform peer.
-K0—Prefer LAPM.
-Q2—Permits downshifting to 2400 bps and 1200 bps.
S-Registers Values
S0=0—Ring number on which to answer (default for USA)
S2=43—Escape character ("+").
S4=10—Character used as line feed.
S5=8—Character recognized as (and used as) backspace.
S6=2—Wait time for blink dial in seconds (default for USA)
S7=50—Wait time for carrier after dialing or answering (in seconds).
S8=2—Duration in seconds of the pause dial modifier (default for USA)
S9=6—Carrier detected response time (in 1/10 sec).
S10=14—Sets delay time from loss of carrier to hang up to 1.4 seconds.
S11=90—Duration and spacing for DTMF tones (in ims intervals) (default for USA)
S12=50—Escape sequence guard time (in 1/50 seconds).
S36=7—MNP connection is attempted when an error-control connection cannot be negotiate. If is failed, a normal mode (&Q6) connection is established.

S37=0—Attempt to connect at speed of last AT command issued.
S38=20—Delay in seconds before forced hang-up.
S89=30—Number of seconds of inactivity (no characters sent from the DTE, no RING) in the offline command state before the modem places itself into standby mode.
S95=2—Append the "/ARQ" to the verbose CONNECT result code if the protocol is not "NONE".
S108=1—Very poor line conditions will cause the &B action to be taken.
S109=62—Allows 4800 bps, 7200 bps, 9600 bps, 12000 bps, and 14400 bps connections to be used with V.32 or V.32bis modem.
S120=0—Turn ETC off.

SECOND PSTN PROFILE

AT Commands
B1—Selects Bell 121A when the modem is at 1200 bps and Bell 103J when the modem is at 300 bps.
E1—Enable echo in the command state.
H0—Switch hook control.
L2—Sets speaker volume level to medium.
M1—Turns the speaker on during dialing and off when carrier is detected.
N1—Determine data rate negotiation; automode enabled.
T—Select tone dialing
Q0—Displays all result codes allowed by W, X and S95.
V1—Displays verbose result codes in English.
W0—CONNECT result code reports DTE speed.
X4—Busy and dial tone detect enabled.
Y0—Disable sending or responding to long space "break".
&B1—Enable V.32/V.32bis auto retrain.
&C1—DCD "ON" if carrier detected.
&D2—Modem enters the command mode and hangs-up if DTR is turned off. &G0—Guard tone disable. &K3—Enables hardware flow control (RTS/CTS). &P0—Selects pulse dial make/break ratio to 39/61%.
&Q5—Enable error control mode.
&S0—Selects Data-Set-Ready always ON.
&U0—Enable Trellis coding—applicable only to V.32 9600 bps modulation.
\A3—Select frame size to be 256 characters per frame.*
%A13—Sets Auto-Reliable fallback character.
\C0—Does not buffer data during error-control negotiation.
%C1—Enable MNP5 data compression.
%E1—Enable 2400 bps V.22bis auto-retrain.
\G0—Disable flow control (XON/XONFF).
\J0—Turn off bps rate adjust.
\K5—Break control.
\N5—Enable reliable link mode.*
\Q3—Selects hardware flow control (RTS and CTS).
\T0—Modem will hang-up after 0 minute if it does not detect any activity.
\V1—MNP Class connect message on.
\X0—Process flow control characters locally.
*H0—Initial connection will be made according to the settings of B, N, S37, and DTE speed.
)M0—Adjust transmit level only if peer does so. (only apply for MNP 10 calls).
-K0—Prefer LAPM V.42 error control protocol.
-Q2—Permits downshifting to 2400 bps and 1200 bps.
S-Registers Values
S0=0—Ring number on which to answer (default for USA)
S2=43—Escape character ("+").
S4=10—Character used as line feed.
S5=8—Character recognized as (and used as) backspace.
S6=2—Wait time for blink dial in seconds (default for USA)
S7=90—Wait time for carrier after dialing or answering (in seconds).*

S8=2—Duration in seconds of the pause dial modifier (default for USA)
S9=6—Carrier detected response time (in $\frac{1}{10}$ sec).
S10=100—Sets delay time from loss of carrier to hang up to 10 seconds.*
S11=90—Duration and spacing for DTMF tones (in 1 ms intervals) (default for USA)
S12=50—Escape sequence guard time (in $\frac{1}{50}$ seconds).
S36=7—MNP connection is attempted when an error-control connection cannot be negotiate. If is failed, a normal mode (&Q6) connection is established.
S37=0—Attempt to connect at speed of last AT command issued.
S38=20—Delay in seconds before forced hang-up.
S89=30—Number of seconds of inactivity (no characters sent from the DTE, no RING) in the offline command state before the modem places itself into standby mode.
S95=2—Append the "/ARQ" to the verbose CONNECT result code if the protocol is not "NONE".
S108=1—Very poor line conditions will cause the &B action to be taken.
S109=62—Allows 4800 bps, 7200 bps, 9600 bps, 12000 bps, and 14400 bps connections to be used with V.32 or V.32bis modem.
S120=12—ETC is enabled for PSTN site connect with transmit de-emphasis off.
These registers are not being displayed via &V command:
S69=15—ARQ Window size K=15.*
S70=20—Set bad frame retry counter to 20.*
S105=2—Selective frame reject, permits fallback (during negotiation handshake) to multiple frame reject only.*
Note.*—Parameters get adjusted by ETC routine during ETC initialization state.

FIRST CELLULAR PROFILE

AT Commands
B1—Selects Bell 121A when the modem is at 1200 bps and Bell 103J when the modem is at 300 bps.
E1—Enable echo in the command state.
H0—Switch hook control.
L2—Sets speaker volume level to medium.
M1—Turns the speaker on during dialing and off when carrier is detected.
N1—Determine data rate negotiation; automode enabled.
T—Select tone dialing.
Q0—Displays all result codes allowed by W, X and S95.
V1—Displays verbose result codes in English.
W0—CONNECT result code reports DTE speed.
X4—Busy and dial tone detect enabled.
Y0—Disable sending or responding to long space "break".
&B1—Enable V.32/V.32bis auto retrain.
&C1—DCD "ON" if carrier detected.
&D2—Modem enters the command mode and hangs-up if DTR is turned off.
&G0—Guard tone disable.
&K3—Enables hardware flow control (RTS/CTS).
&P0—Selects pulse dial make/break ratio to 39/61%.
&Q5—Enable error control mode.
&S0—Selects Data-Set-Ready always ON.
&U0—Enable Trellis coding—applicable only to V.32 9600 bps modulation.
\A4—Select frame size to be 32 characters per frame.*
%A13—Sets Auto-Reliable fallback character.
\C0—Does not buffer data during error-control negotiation.
%C1—Enable MNP5 data compression.
%E1—Enable 2400 bps V.22bis auto-retrain.
\G0—Disable flow control (XON/XONFF).
\J0—Turn off bps rate adjust.

\K5—Break control.
\N5—Enable reliable link mode. *
\Q3—Selects hardware flow control (RTS and CTS).
\T0—Modem will hang-up after 0 minute if it does not detect any activity.
\V1—MNP Class connect message on.
\X0—Process flow control characters locally.
*H0—Initial connection will be made according to the settings of B, N, S37, and DTE speed.
)M0—Adjust transmit level only if peer does so. (only apply for MNP10 calls).
-K0—Prefer LAPM V.42 error control protocol.
-Q2—Permits downshifting to 2400 bps and 1200 bps.
S-Registers Values
S0=0—Ring number on which to answer (default for USA)
S2=43—Escape character ("+").
S4=10—Character used as line feed.
S5=8—Character recognized as (and used as) backspace.
S6=2—Wait time for blink dial in seconds (default for USA)
S7=90—Wait time for carrier after dialing or answering (in seconds). *
S8=2—Duration in seconds of the pause dial modifier (default for USA)
S9=6—Carrier detected response time (in 1/10 sec).
S10=100—Sets delay time from loss of carrier to hang up to 10 seconds. *
S11=90—Duration and spacing for DTMF tones (in 1ms intervals) (default for USA)
S12=50—Escape sequence guard time (in 1/50 seconds).
S36=7—MNP connection is attempted when an error-control connection cannot be negotiate. If is failed, a normal mode (&Q6) connection is established.
S37=0—Attempt to connect at speed of last AT command issued.
S38=20—Delay in seconds before forced hang-up.
S89=30—Number of seconds of inactivity (no characters sent from the DTE, no RING) in the offline command state before the modem places itself into standby mode.
S95=2—Append the "/ARQ" to the verbose CONNECT result code if the protocol is not "NONE".
S108=1—Very poor line conditions will cause the &B action to be taken.
S109=62—Allows 4800 bps, 7200 bps, 9600 bps, 12000 bps, and 14400 bps connections to be used with V.32 or V.32bis modem.
S120=10—ETC is enabled for cellular direct connect with transmit de-emphasis off.
These registers are not being displayed via &V command:
S69=15—ARQ Window size K=15.*
S70=20—Set bad frame retry counter to 20. *
S105=2—Selective frame reject, permits fallback (during negotiation handshake) to multiple frame reject only.*
Note: *—Parameters get adjusted by ETC routine during ETC initialization state.

SECOND CELLULAR PROFILE

AT Commands
B1—Selects Bell 121A when the modem is at 1200 bps and Bell 103J when the modem is at 300 bps.
E1—Enable echo in the command state.
H0—Switch hook control.
L2—Sets speaker volume level to medium.
M1—Turns the speaker on during dialing and off when carrier is detected.
N1—Determine data rate negotiation; automode enabled.
T—Select tone dialing.
Q0—Displays all result codes allowed by W, X and S95.
V1—Displays verbose result codes in English.
W0—CONNECT result code reports DTE speed.
X4—Busy and dial tone detect enabled.
Y0—Disable sending or responding to long space "break".
&B1—Enable V.32/V.32bis auto retrain.
&C1—DCD "ON" if carrier detected.
&D2—Modem enters the command mode and hangs-up if DTR is turned off.
&G0—Guard tone disable.
&K3—Enables hardware flow control (RTS/CTS).
&P0—Selects pulse dial make/break ratio to 39/61%.
&Q5—Enable error control mode.
&S0—Selects Data-Set-Ready always ON.
&U0—Enable Trellis coding—applicable only to V.32 9600 bps modulation.
\A0—Select frame size to be 64 characters per frame.
%A13—Sets Auto-Reliable fallback character.
\C0—Does not buffer data during error-control negotiation.
%C1—Enable MNP5 data compression.
%E1—Enable 2400 bps V.22bis auto-retrain.
\G0—Disable flow control (XON/XONFF).
\J0—Turn off bps rate adjust.
\K5—Break control.
\N3—Selects auto-reliable link mode: V.42 LAPM or MNP. V.42 detection enabled.
\Q3—Selects hardware flow control (RTS and CTS).
\T0—Modem will hang-up after 0 minute if it does not detect any activity.
\V1—MNP Class connect message on.
\X0—Process flow control characters locally.
*H0—Initial connection will be made according to the settings of B, N, S37, and DTE speed.
)M1—For cellular site modem: adjust transmit levels and inform peer.
-K2—Prefer MNP. When answering yield to the preference of the remote modem.
-Q2—Permits downshifting to 2400 bps and 1200 bps.
S-Registers Values
S0=0—Ring number on which to answer (default for USA)
S2=43—Escape character ("+").
S4=10—Character used as line feed.
S5=8—Character recognized as (and used as) backspace.
S6=2—Wait time for blink dial in seconds (default for USA)
S7=50—Wait time for carrier after dialing or answering (in seconds).
S8=2—Duration in seconds of the pause dial modifier (default for USA)
S9=6—Carrier detected response time (in 1/10 sec.).
S10=50—Sets delay time from loss of carrier to hang up to 5 seconds.
S11=90—Duration and spacing for DTMF tones (in 1ms intervals) (default for USA)
S12=50—Escape sequence guard time (in 1/50 seconds).
S36=7—MMP connection is attempted when an error-control connection cannot be negotiate. If is failed, a normal mode (&Q6) connection is established.
S37=0—Attempt to connect at speed of last AT command issued.
S38=20—Delay in seconds before forced hang-up.
S89=30—Number of seconds of inactivity (no characters sent from the DTE, no RING) in the offline command state before the modem places itself into standby mode.
S95=2—Append the "/ARQ" to the verbose CONNECT result code if the protocol is not "NONE".
S108=1—Very poor line conditions will cause the &B action to be taken.

S109=62—Allows 4800 bps, 7200 bps, 9600 bps, 12000 bps, and 14400 bps connections to be used with V.32 or V.32bis modem.

S120=0—Turn ETC off.

In the foregoing description, the invention is described with reference to specific exemplary embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, a method and apparatus for automatically selecting between a plurality of operational modes has been described.

What is claimed is:

1. A modem device comprising:
   a first connector to allow coupling to a telecommunications transmission system, the first connector to transmit a mode select signal and the first connector to receive a first plurality of signals from the telecommunications transmission system;
   a selector to receive the mode select signal on a mode select line from said first connector and to select an initial operational mode between a plurality of operational modes in response to said mode select signal, the selector to poll the mode select line to check for a change in the mode select signal, the selector to switch to a different operational mode based on the change in the mode select signal;
   a circuit coupled to said selector to receive the first plurality of signals from said telecommunications transmission system in a selected operational mode and to transmit a second plurality of signals to a computer system wherein said circuit also is to receive a third plurality of signals from said computer system and to transmit a fourth plurality of signals on said telecommunications transmission system in said selected operational mode, a first connector to allow coupling to a telecommunications transmission system, said first plurality of signals separate from said mode select signal; and
   a second connector coupled between the circuit and the first connector, the second connector to receive the mode select signal from the first connector and the second connector to deliver the mode select signal to the selector.

2. The modem device of claim 1 wherein said selector is coupled to a pin in said first connector.

3. The modem device of claim 1 wherein said modem device is capable of transmitting and receiving facsimile transmissions.

4. The modem device of claim 1 wherein said mode select signal comprises of a floating signal.

5. The modem device of claim 1 wherein said mode select signal comprises of a ground potential.

6. The modem device of claim 1 wherein a first mode of said plurality of said operational modes is an analog public switched telephone network mode and wherein a second mode of said plurality of operational modes is an analog cellular telephone mode.

7. The modem device of claim 1 wherein a first mode of said plurality of said operational modes is an analog public switched telephone network mode and wherein a second mode of said plurality of operational modes is a digital cellular telephone mode.

8. A computer system comprising:
   a bus providing communication links between components in said computer system;
   external memory coupled to said bus capable of storing information;
   a microprocessor coupled to said external memory and said bus capable of executing instructions and processing data;
   a first connector allowing coupling to a telecommunications transmission system, said telecommunications transmission system including a plurality of signals for transmitting information, the first connector to generate a mode select signal on a mode select line, said mode select signal separate from said plurality of signals for transmitting information;
   a modem device coupled to said bus and coupled to said first connector, the modem device including a second connector to couple the modem device to the first connector, said modem device capable of receiving the mode select signal from said first connector through the second connector, and said modem device to select a first mode between a plurality of operational modes in response to said mode select signal, the selector to poll the mode select line to check for a change in the mode select signal, the selector to switch to a different operational mode based on the change in the mode select signal, wherein said first mode of said plurality of operational modes is a first telecommunications transmission mode and said second mode of said plurality of operational modes is a second telecommunications mode; and
   a battery device coupled to said external memory, microprocessor and modem device capable of supplying power to said external memory, microprocessor and modem device.

9. The computer system of claim 8 wherein a first mode of said plurality of said operational modes is an analog public switched telephone network mode and wherein a second mode of said plurality of operational modes is an analog cellular telephone mode.

10. In a modem, a method for configuring said modem comprising:
   receiving a mode select signal on a mode select line from a first connector through a second connector, the first connector coupled to a telecommunications transmission system, the first connector to generate the mode select signal;
   selecting an initial transmission mode from a plurality of transmission modes in response to said mode select signal;
   receiving a first plurality of signals from said telecommunications transmission system in said selected transmission mode, said first plurality of signals separate from the mode select signal;
   transmitting a second plurality of signals corresponding to said first plurality of signals to a computer system;
   receiving a third plurality of signals from said computer system;

transmitting a fourth plurality of signals to said telecommunications transmission system in said selected transmission mode;

polling said mode select line to check for a change in the mode select signal; and switching to a different operational mode based on the change in the mode select signal.

11. The method of claim 10 wherein said first plurality of signals comprise a portion of a first facsimile transmission and said second plurality of signals comprise a portion of a second facsimile transmission.

12. The method of claim 10, wherein receiving a mode select signal from a first connector through a second connector comprises:

sampling a mode select line for said mode select signal.

13. The method of claim 10 wherein said transmission mode is an analog cellular telephone mode.

14. The method of claim 13 wherein said mode select signal is a floating signal.

15. The method of claim 10 wherein said transmission mode is an analog public switched telephone network mode.

16. The method of claim 15 wherein said mode select signal is a ground potential.

17. The method of claim 10 wherein selecting a transmission mode from a plurality of transmission modes in response to said mode select signal comprises:

retrieving operational parameters from memory corresponding to said transmission mode; and storing said operational parameters into a plurality of registers.

18. A modem device comprising:

a first connector to allow coupling to a telecommunications transmission system, the first connector to transmit a mode select signal and the first connector to receive a first plurality of signals from the telecommunications transmission system;

a selector to receive the mode select signal on a mode select line from said first connector and to select an initial operational mode between a plurality of operational modes in response to said mode select signal, the selector to switch to a different operational mode based on an interrupt signal, the interrupt signal being a transition edge in the mode select signal;

a circuit coupled to said selector to receive the first plurality of signals from said telecommunications transmission system in a selected operational mode and to transmit a second plurality of signals to a computer system wherein said circuit also is to receive a third plurality of signals from said computer system and to transmit a fourth plurality of signals on said telecommunications transmission system in said selected operational mode, a first connector to allow coupling to a telecommunications transmission system, said first plurality of signals separate from said mode select signal; and a second connector coupled between the circuit and the first connector, the second connector to receive the mode select signal from the first connector and the second connector to deliver the mode select signal to the selector.

19. The modem device of claim 18 wherein the initial operational mode of said plurality of said operational modes is an analog public switched telephone network mode and wherein the different operational mode of said plurality of operational modes is an analog cellular telephone mode.

20. In a modem, a method for configuring said modem comprising:

receiving a mode select signal on a mode select line from a first connector through a second connector, the first connector coupled to a telecommunications transmission system, the first connector to generate the mode select signal;

selecting an initial transmission mode from a plurality of transmission modes in response to said mode select signal;

receiving a first plurality of signals from said telecommunications transmission system in said selected transmission mode, said first plurality of signals separate from the mode select signal;

transmitting a second plurality of signals corresponding to said first plurality of signals to a computer system;

receiving a third plurality of signals from said computer system;

transmitting a fourth plurality of signals to said telecommunications transmission system in said selected transmission mode;

receiving an interrupt signal; and switching to a different transmission mode based on the interrupt signal.

21. The method of claim 20 wherein selecting an initial transmission mode from a plurality of transmission modes in response to said mode select signal comprises:

retrieving operational parameters from memory corresponding to said initial transmission mode; and storing said operational parameters into a plurality of registers.

* * * * *

UNITED STATES PATENT AND TRADEMARK OFFICE
CERTIFICATE OF CORRECTION

| | |
|---|---|
| PATENT NO. : 6,038,294 | Page 1 of 1 |
| DATED : March 14, 2000 | |
| INVENTOR(S) : Tran, et. al. | |

It is certified that error appears in the above-identified patent and that said Letters Patent is hereby corrected as shown below:

In column 3, at line 5, delete "(Ne)" and insert —(NiMH)—.

In column 3, at line 9, delete "CAROM' and insert —CD-ROM—.

In column 5, at line 58, insert "Under" before "a fourth embodiment,"

In column 5, at line 58, begin new paragraph after "given frequency at a second phase."

In column 6, at line 53, after "chipset 212" Insert —"."—

In column 8, at line 62, delete "ims" and insert —Ims—.

In column 12, at line 55, delete "MMP" and insert —MNP—.

Signed and Sealed this

Fifth Day of June, 2001

*Attest:*

*Attesting Officer*

NICHOLAS P. GODICI
*Acting Director of the United States Patent and Trademark Office*